J. KOENIG.
BALL AND SOCKET PIPE JOINT.
APPLICATION FILED SEPT. 24, 1910.
994,471.
Patented June 6, 1911.
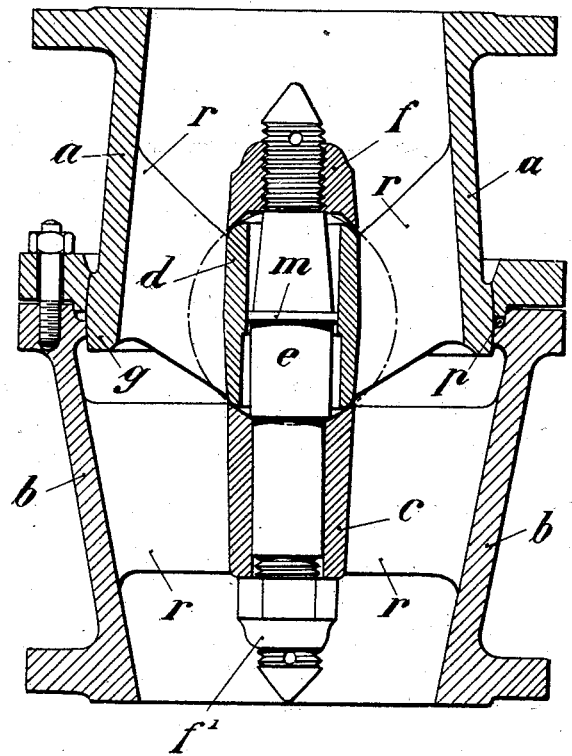

UNITED STATES PATENT OFFICE.

JOHANN KOENIG, OF RIGA, RUSSIA.

BALL-AND-SOCKET PIPE-JOINT.

994,471. Specification of Letters Patent. Patented June 6, 1911.

Application filed September 24, 1910. Serial No. 583,540.

*To all whom it may concern:*

Be it known that I, JOHANN KOENIG, a subject of the King of Bavaria, residing at 97 Alexanderstrasse, Riga, Russia, have invented new and useful Improvements in Ball-and-Socket Pipe-Joints, of which the following is a specification.

The subject-matter of my invention is an improved ball-and-socket pipe-joint, in which the two ends of the pipe, which are revoluble relatively to one another in well-known manner, are relieved in such manner by a bolt carried by ribs in the ends of the pipes that the ball-and-socket joint is able to take up internal pressure both above and below atmospheric.

A primary object of my invention is to provide an inexpensive special construction of the parts of the ball-and-socket joint which insures the parts of the joint connected with one another being able to rotate readily.

One illustrative embodiment of my invention is represented in longitudinal section in the accompanying drawing.

Referring to the drawing, my ball-and-socket pipe-joint comprises the tubular socket $b$, the tubular member $a$ fitting into the same and a bolt $e$ which connects these members, passes through the hubs or sleeves $d$, $c$ carried by the ribs $r$, and is secured at its ends by means of nuts $f$, $f'$ abutting against said hubs. The bolt $e$ abuts in addition by means of a shoulder $m$ against the hub $d$. The joint between the tubular members $a$, $b$ is packed by the packing $p$.

The part $g$ of the tubular member $a$, around which the packing $p$ is placed, is spherical and its center coincides with the center of the joint. The ends of the hub $d$ are also turned substantially spherical, that is approximately according to the dotted circle shown in the drawing. The concave faces of the nut $f$ and hub $c$ facing the ends of the hub $d$ are spherical, so that the formations of these hollow cones form tangents to the spherical faces of the part $d$. Consequently, the tubular member $a$ can rotate spherically with regard to the tubular member $b$, while the ends of the hub $d$ always lie against the two conical faces of the nut $f$ and the hub $c$. Internal excess pressure above atmospheric is taken up by the concave bottom face of the nut $f$, while the conical face of the hub $c$ takes up pressure due to internal pressure below atmospheric.

I claim:—

In a ball and socket pipe joint, the combination with a tubular socket and a tubular member fitting into the same, of a sleeve having rounded ends mounted in the center of the tubular member, a second and coaxial sleeve fitting one end of the first sleeve and mounted in the said tubular socket, a bolt passing centrally through said sleeves, a nut on one end of the bolt bearing against the end of the first sleeve, a nut on the other end of the bolt bearing against the end of the second sleeve, and a shoulder abutting against the wall of the first sleeve in the central plane of the joint, for the purpose specified.

JOHANN KOENIG.

Witnesses:
RUDOLF LESCHINSKY,
ALEXANDER STERNBERG.

---

Copies of this patent may be obtained for five cents each, by addressing the "Commissioner of Patents, Washington, D. C."